United States Patent [19]

Pees

[11] Patent Number: 4,988,082
[45] Date of Patent: Jan. 29, 1991

[54] SPLICED AIR SLEEVE ASSEMBLY FOR AIR SPRING DAMPER

[75] Inventor: James M. Pees, Centerville, Ohio

[73] Assignee: General Motors Corporation, Detroit, Mich.

[21] Appl. No.: 381,229

[22] Filed: Jul. 18, 1989

[51] Int. Cl.[5] .............................................. F16F 9/04
[52] U.S. Cl. ............................ 267/64.240; 92/98 D; 92/103 R; 267/122; 267/64.27
[58] Field of Search .............. 267/64.11, 64.27, 64.24, 267/64.25, 64.23, 122, 64.21, 64.19, 64.15; 92/103 R, 98 D, 103 F; 280/709, 708

[56] References Cited

U.S. PATENT DOCUMENTS

| | | | |
|---|---|---|---|
| 3,549,142 | 12/1970 | Tilton | 267/64.24 |
| 3,897,941 | 8/1975 | Hirtreiter et al. | 267/64.24 |
| 4,325,541 | 4/1982 | Korosladanyi et al. | 267/64.21 X |
| 4,518,154 | 5/1985 | Merkle | 267/34 |
| 4,722,516 | 2/1988 | Gregg | 267/64.27 |
| 4,741,517 | 5/1988 | Warmuth, II et al. | 267/64.24 |
| 4,763,883 | 8/1988 | Crabtree | 267/64.27 |

Primary Examiner—Douglas C. Butler
Attorney, Agent, or Firm—A. Michael Tucker

[57] ABSTRACT

A two-part, spliced air sleeve assembly for use with an air spring damper includes a first corded, resilient sleeve member bonded to a second corded, resilient sleeve member. The bond angles and fabrics of the first sleeve members are selected so that the first sleeve inflates to a smaller diameter than the second sleeve. A first fastener secures the first sleeve member to the second portion of a damper. A second fastener secures the upper sleeve to a piston rod of the damper to form a closed chamber for receiving pressurized fluid. When inflated for operation, the first sleeve has a smaller diameter than the second sleeve.

7 Claims, 2 Drawing Sheets

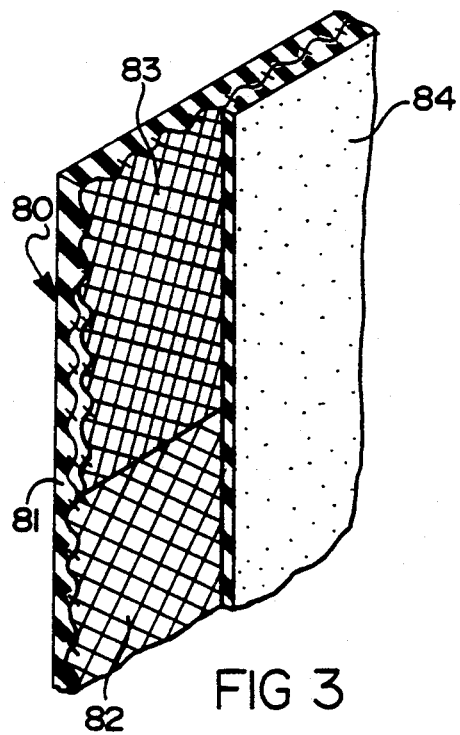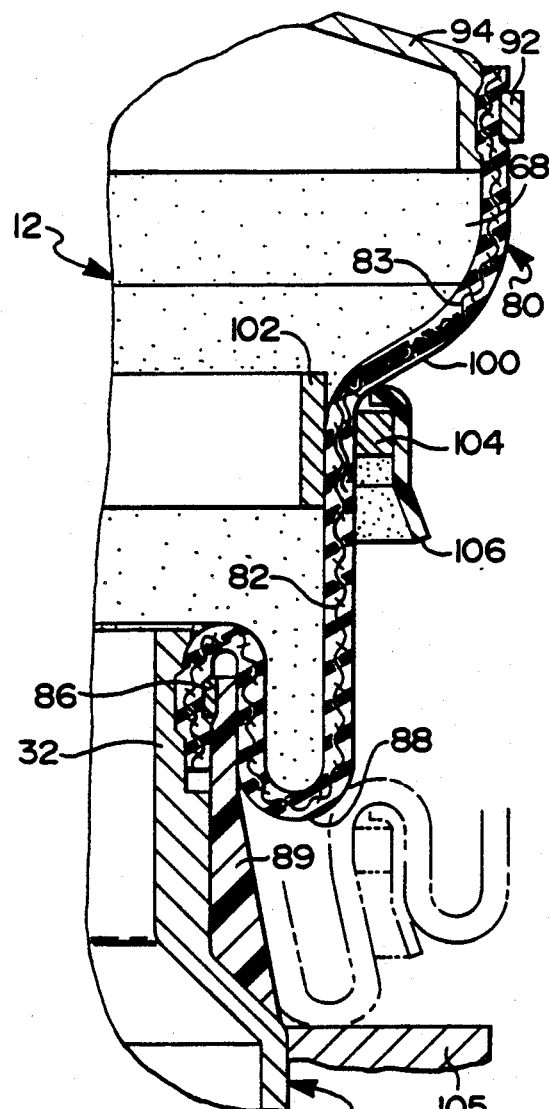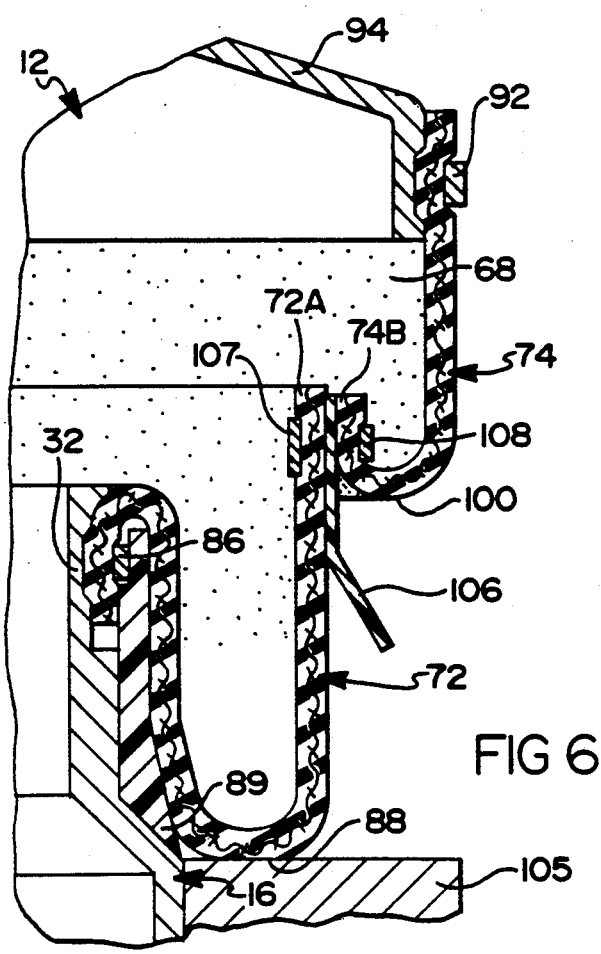

4,988,082

SPLICED AIR SLEEVE ASSEMBLY FOR AIR SPRING DAMPER

BACKGROUND OF THE INVENTION

1. Field of the Invention

The present invention relates generally to vehicle suspension. In particular, the present invention is concerned with a spliced air sleeve assembly for use with an air spring damper. When inflated for operation, the air sleeve assembly inflates to at least two portions having different diameters.

2. Statement of the Related Art

An air spring combined with a damper to provide a suspension device for a vehicle is well-known. Many conventional air springs employ an air sleeve constructed from a resilient material for forming a closed chamber to receive a pressurized fluid. Oftentimes, the air sleeve includes a corded fabric or a nylon cord to strengthen the sleeve and retain the sleeve's shape. Depending upon the desired spring-characteristic, a selected volume of air or another fluid is introduced into the chamber. The air sleeve inflates to a desired diameter as determined by the corded fabric. Examples of an air sleeve combined with a damper can be found in the following U.S. Pat. Nos.: 4,635,909, 4,688,774 and 4,763,883.

Many conventional air sleeves are molded as a tubular element having a constant uninflated diameter. When inflated for operation, the resilient material of an air sleeve expands until the cords of an embedded fabric are fully tensioned. At this point, the air sleeve will no longer expand and has reached its maximum diameter. When inflated, an air sleeve has a constant diameter.

It is important that an air sleeve combined with a damper operate without interfering with the rolling lobe action. To reduce wear and the possibility of puncture, an air sleeve should not rub or interfere with any elements of the vehicle suspension.

In some automotive suspension systems employing a strut, forces incurred by strut elements are reduced by tilting the air spring relative to the longitudinal axis of the strut. Particularly at the upper portions of the air spring, it is important that the inflated diameter of the air sleeve be large enough to avoid interference with a piston rod.

SUMMARY OF THE INVENTION

The present invention includes an air sleeve assembly for use with an air spring damper. A two-part, spliced air sleeve assembly provides an upper sleeve capable of inflating to a greater diameter than a lower sleeve. Due to the selected cord angles, a first corded fabric in the upper sleeve permits the sleeve assembly to expand from an unpressurized condition to a greater diameter than a lower sleeve having a second corded fabric. The upper air sleeve permits the air sleeve assembly to be mounted in angled orientation for strut applications without causing interference between the air sleeve assembly and vehicle suspension components.

In a preferred embodiment, the present invention includes a two-part, spliced air sleeve assembly for use with an air spring damper. The air sleeve includes a first corded, resilient sleeve member bonded to a second corded, resilient sleeve member. The bond angles and fabrics of the sleeve members are selected so that the first sleeve inflates to a smaller diameter than the second sleeve. A first fastener secures the first sleeve member to the upper portion of a damper. A second fastener secures the second sleeve to a piston rod of the damper to form a closed chamber for receiving pressurized fluid. When inflated for operation, the first sleeve has a smaller diameter than the second sleeve.

In various embodiments, a pair of rolling lobe members are provided in the first and second sleeve members which travel as the air spring damper is actuated.

BRIEF DESCRIPTION OF THE DRAWINGS

FIG. 3 is an enlarged perspective view of a portion the present spliced air sleeve assembly utilized in FIG. 1 with the outer surface broken away to reveal a corded fabric

FIG. 5 is a partial, enlarged sectional view of the present spliced air sleeve assembly illustrated in FIG. 3 having a support and a second rolling lobe, wherein the sleeve assembly is shown in solid lines at the end of the rebound stroke and in phantom lines at the end of the compression stroke.

FIG. 6 is a partial, enlarged sectional view of the alternative spliced air sleeve assembly having a second rolling lobe.

DETAILED DESCRIPTION OF THE PREFERRED EMBODIMENT

Figure 1:
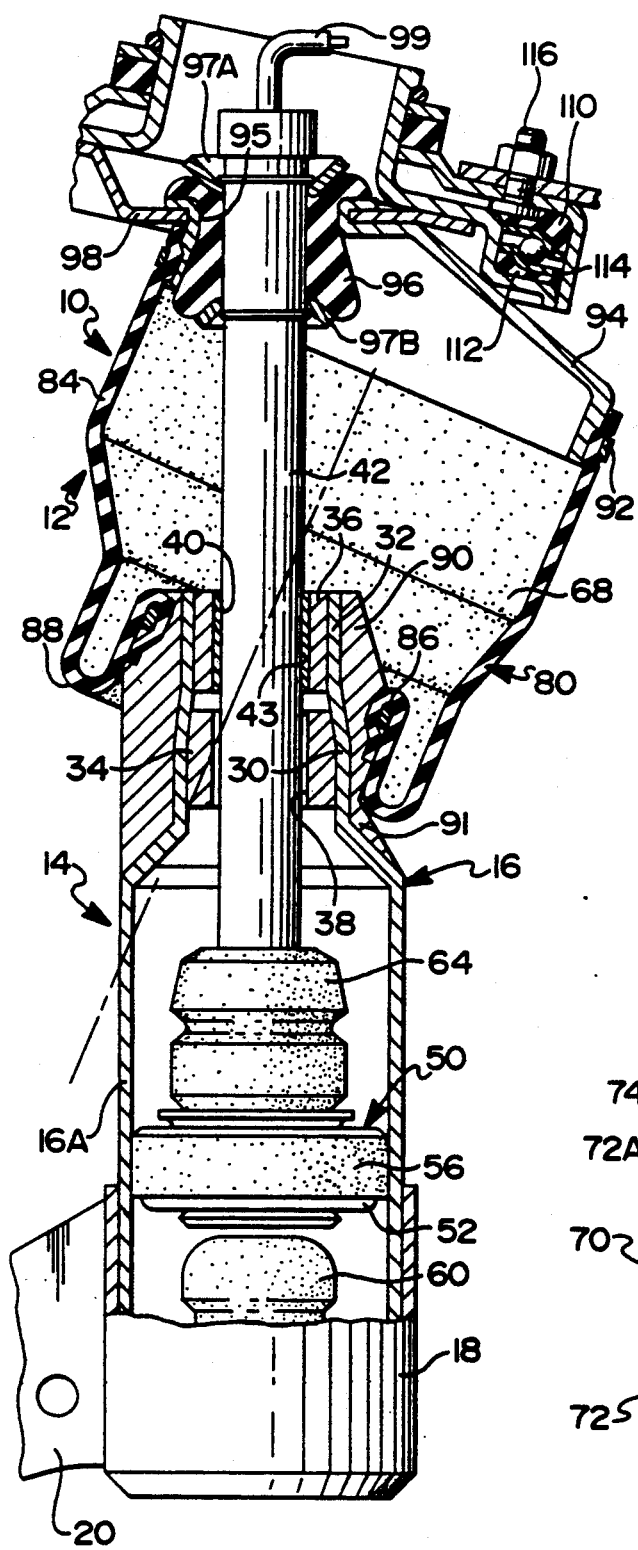
FIG. 1 is a partially sectional view of an inflated air spring damper employing a spliced air spring assembly of the present invention.

An air spring damper, indicated generally at 10, is illustrated in FIG. 1. Damper 10 includes an air spring 12 mounted on a damper assembly 14 to provide desired suspension of a vehicle.

Damper assembly 14 includes a rigid reservoir tube 16 formed from aluminum or other suitable material. Preferably, reservoir tube 16 is a one-piece cylindrical member having an upper portion with reduced diameter sections. A base cup 18 is welded or otherwise secured in an airtight manner to the lower end of reservoir tube 16. If desired, a conventional seal (not illustrated) can be placed between the outside diameter of the reservoir tube 16 and the inside diameter of the base cup 18. A knuckle 20 is secured to the base cup 18 to provide a mount for a wheel support assembly (not illustrated) in a well-known manner.

Reservoir tube 16 extends upwardly from base cup 18 as a cylindrical main body 16A extending approximately about two-thirds of its overall length The upper third of the reservoir tube 16 includes a pair of reduced diameter portions 30 and 32. Intermediate portion 30 carries a cylindrical metallic rebound stop 34 secured to its inner wall. Upper step 32 carries a cylindrical metallic rod guide 36 secured to its inner wall. Rebound stop 34 and rod guide 36 have aligned, centralized, cylindrical openings 38 and 40, respectively, to accommodate a cylindrical piston rod 42. A cylindrical antifriction bearing 43 is press-fitted into the inner wall of rod guide opening 40. Preferably, bearing 43 is constructed from sintered bronze and TEFLON (polytetrafluoroethylene), and forms a low-friction bearing for the piston rod 42.

Secured to the lower end of piston rod 42 is a valved piston assembly 50 which includes a generally cylindrical shell 52 dimensioned to slidably fit within the reservoir tube 16. Shell 52 carries an overlapping band-type annular seal 56 of graphite-filled TEFLON or other suitable antifriction material. A valve assembly (not illustrated) is carried internally in the shell 52 to permit the transfer of fluid between the upper and lower portions of the reservoir tube 16. A particular type of valve assembly suitable for piston assembly 50 is described in applicant's pending U.S. patent application Ser. No. 181,478, filed Apr. 14, 1988, titled "Air Spring Damper For Vehicle Suspension" and assigned to the same assignee as the assignee of this application. The valve assembly described in U.S. Ser. No. 181,478 is hereby incorporated by reference.

It is desirable to include a resilient or compression jounce bumper 60 mounted in the interior base of the cylindrical tube 16. Furthermore, a resilient rebound bumper 64 can be fitted around the piston rod 42 above the piston shell 52.

Air spring 12 includes a closed chamber 68 for receiving a pressurized fluid formed by either air sleeve assembly 80 or air sleeve assembly 70, each of which is described below. Air spring 12 is tilted relative to the longitudinal axis of damper 14 to reduce loads incurred by elements of damper 14.

Figure 2:
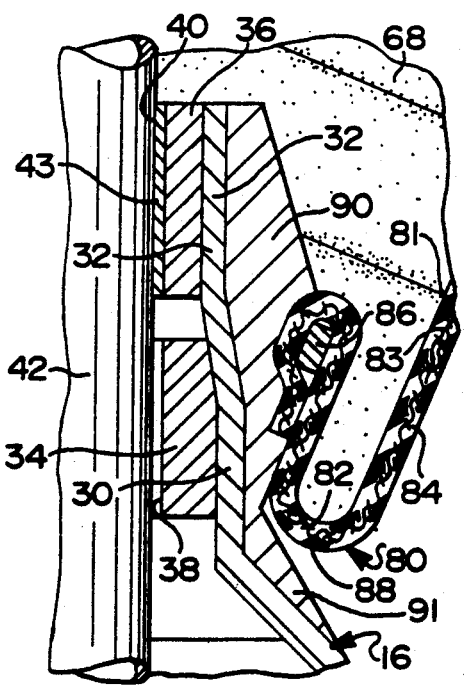
FIG. 2 is a partial, enlarged sectional view of the present spliced air sleeve assembly utilized in FIG. 1.

A first embodiment of a sleeve assembly 80 for use with air spring 12 is illustrated in FIGS. 2 and 3 wherein a sleeve having corded portions of different cord angles is molded as an integral unit. Sleeve assembly 80 includes an inner or high pressure layer 81 of resilient material bonded to a first corded fabric 82. A second corded fabric 83 is overlapped and nested to the first corded fabric 82. An outer or lower pressure layer 84 of resilient material completes the sleeve assembly 80. The bond angles and materials of fabrics 82 and 83 are selected so that the inflated diameter of the upper portion of sleeve assembly 80 is greater than the inflated diameter of the lower portion of sleeve assembly 80.

Figure 4:
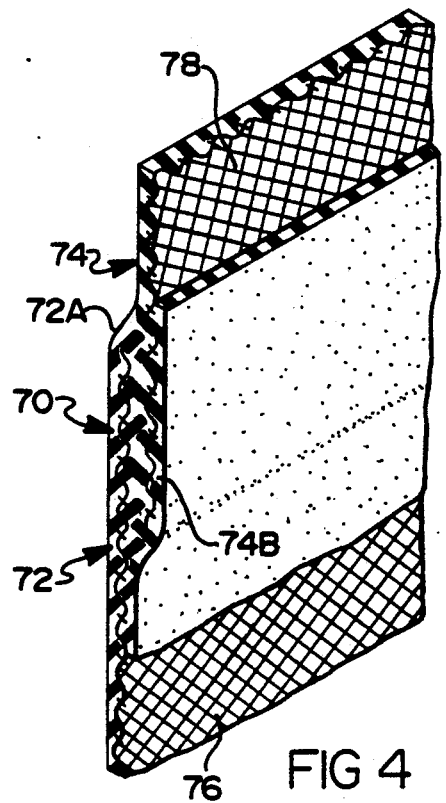
FIG. 4 is an enlarged perspective view of a portion of an alternative construction of the present spliced air sleeve assembly with the outer surface broken away to reveal a corded fabric.

A second embodiment of a sleeve assembly, indicated at 70 and illustrated in FIG. 4, includes a first or lower sleeve 72 and a second or upper sleeve 74. Lower sleeve 72 is formed from a resilient material and includes an embedded corded fabric 76. In a similar manner, upper sleeve 74 is formed from a resilient material and includes an embedded corded fabric 78. The upper end 72A of lower sleeve 72 is overlapped and bonded to the lower end 74B of upper sleeve 74. The resilient materials of sleeves 72 and 74 can be bonded to form a joint at the overlapped sections of fabrics 76 and 78. Furthermore, the terminating ends of sleeves 72 and 74 can be rounded by conventional methods. The bond angles and materials of fabrics 76 and 78 are selected so that the inflated diameter of upper sleeve 74 is greater than the inflated diameter of the lower sleeve 72.

As an illustrative example, the cord angles for fabrics 78 and 83 can be in the range of approximately 65°–70° and the cord angles for fabrics 76 and 82 can be in the range of approximately 50°–55°. When inflated, the diameters for the upper portions of sleeve assemblies 80 and 70 will be greater than the diameter of the lower portions. For example, the upper portion diameters may be selected in the range of 110–135 mm, while the lower portion may be selected in the range of 80–105 mm.

For clarity, the description below will refer to the use of sleeve assembly 80 with air spring 12. It should be understood that either air sleeve assembly 80 or air sleeve assembly 70 can be utilized to form air spring 12 for use with the damper 10, as illustrated in FIG. 1.

A profiled contact piston 90 is slip fitted over the stepped upper portions 30 and 32 of the reservoir tube 16 for support of the air spring 12. The lower end of sleeve assembly 80 is secured about the upper portion of the contact piston 90 by a clamp or band 86. A rolling lobe 88 is provided in the portion of the sleeve assembly 80 containing only fabric 82. Lobe 88 is a rolling element which travels down and up the contact piston 90 during compression and rebound of the air spring 12. Piston 90 is a generally cylindrical member having an increased diameter portion 91 at its lower end. Preferably, piston 90 is formed from a rigid plastic material and provides an optimized surface to accommodate the rolling action of the lobe 88 with reduced friction.

The upper end of the air spring 12 is secured to a top mount in an airtight fashion in any suitable manner. A particular assembly for securing the upper end of sleeve assembly 80 includes a circular band or clamp 92 for retaining sleeve assembly 80 to a retainer 94. Retainer 94 includes an opening 95 which receives an elastomeric bushing 96. Bushing 96 and washers 97A and 97B receive the upper end of piston rod 42. A mounting plate 98 cooperates with retainer 94 for conventionally securing the upper end of piston rod 42 with respect to a vehicle, e.g. through fastener 116. If desired, an upper race 110 and a lower race 112 can be utilized to contain bearing element 114. If desired, an air fitting 99 can be mounted in the upper end of piston rod 42.

The cord angles and materials of fabrics 78 and 83 permit the upper portions of sleeve assemblies 70 and 80, respectively, to inflate to a selected diameter and avoid interference with piston rod 42. During inflation of air sleeve 12, the resilient layers of sleeve assemblies 70 and 80 radially expand until the selected shape and diameter are obtained by pantographing of fabrics 76, 78 and 82, 83. The cord angles and materials of such fabrics are selected to produce an air sleeve 12 having different portions of varying diameters. For example, because of its cord angle, upper sleeve 74 inflates to a desired diameter and does not interfere with the piston rod 42 or any other element during operation of damper 10. The cord angles of fabrics 76 and 82 result in lower portions of sleeve assemblies 70 and 80, respectively, maintaining smaller diameters, thereby permitting unrestricted operation of rolling lobe 88.

In FIG. 5, an alternative configuration of air spring 12 having two rolling lobes is illustrated. The lower portion of sleeve assembly 80 is secured by clamp 86 to the upper portion of reservoir tube 16. Rolling lobe 88 is provided and travels along contact piston 89 as described above. Above the overlapped portions of corded fabrics 82 and 83, a second rolling lobe 100 is provided in the upper portion of sleeve assembly 80. An annular support 102, constructed from a rigid material, is provided in the interior portion of the closed chamber 68 of air sleeve 12. Preferably, support 102 has a diameter approximately equal to the desired diameter of the inflated lower portion of sleeve assembly 80. Sleeve assembly 80 is secured and held in place to support 102 by clamp 104. Sleeve assembly 80 is folded over clamp 104 to provide the second rolling lobe 100. Lobe 100 travels along a contact piston 106. The upper portion of sleeve assembly 80 is held in place against retainer 94 by clamp 92 as described above. The cord angle of fabric 83 permits the upper portion of sleeve assembly 80 to expand to a diameter sufficient to avoid interference with piston rod 42. When the sleeve assembly 80 reaches the bottom of its jounce or compression stroke as illustrated in phantom lines, rolling lobe 88 engages a stop member 105 provided adjacent the lower end of the contact piston 89. As damper 10 and air spring 12 operate during compression and rebound, rolling lobes 88 and 100 travel along their respective contact pistons 89 and 106 and work in series to provide suspension.

A further embodiment of the present air sleeve 12 is illustrated in FIG. 6. In this embodiment, sleeves 72 and 74 have not been bonded to each other. Lower air sleeve 72 is clamped to the upper portion of reservoir tube 16 by clamp 86 and includes rolling lobe 88 traveling on contact piston 89. Clamps 107 and 108 secure the upper portion 72A of lower sleeve 72 and the lower portion 74B of upper sleeve 74 to each other. Contact piston 106 is provided along the outer surface of the upper portion of lower sleeve 72. Rolling lobe 100 is provided in the upper sleeve 74 and travels along contact piston 106 as rolling lobe 88 engages stop member 105 at the end of the compression stroke. During operation of the damper 10 and air sleeve 12, rolling lobes 88 and 100 work in series to provide suspension.

In the embodiments of air sleeve 12 illustrated in FIG. 6, the cord angle of fabric 78 permits a greater inflated diameter of upper sleeve 74 as compared to the inflated diameter of lower sleeve 72. Particularly in strut applications, or other applications which have physical space limitations, a greater diameter of the upper portion of air sleeve 74 permits operation of the air sleeve 12 without interference from other elements of a vehicle suspension.

It will be understood that the air spring 12 of the present invention can be incorporated with various dampers for automobiles. In particular, air spring 12 having air sleeve 70 can be adapted and utilized with a MacPherson strut.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A suspension device for a vehicle, comprising:
    (a) a damper having relatively movable telescopic parts including
        (i) a rigid tubular member,
        (ii) a piston assembly mounted inside the tubular member for stroking movement,
        (iii) a piston rod connected to the piston assembly and extending through one end of the tubular member,
    (b) air sleeve means having
        (i) a first tubular sleeve constructed from a corded elastomeric material;
        (ii) a second tubular sleeve constructed from a corded elastomeric material and connected to the first sleeve, wherein the cord angles of the first and second sleeves are selected so that the inflated diameter of the second tube is greater than the inflated diameter of the first tube;
    (c) first fastener means for securing a lower portion of the first sleeve in an airtight manner with respect to the tubular member, wherein a rolling lobe is provided in the portion of the first sleeve between the first fastener means and the second sleeve; and
    (d) a second fastener means for securing an upper portion of the second sleeve in an airtight manner with respect to the piston rod so that the first and second sleeves form a closed chamber for receiving pressurized fluid, the chamber surrounding a portion of the damper to provide an air spring capable of yieldably resisting telescopic movement with the damper.

2. The suspension device as specified in claim 1 wherein the first and second sleeves are bonded to each other.

3. The suspension device as specified in claim 1 wherein the connected ends of the first and second sleeves are rounded.

4. An air sleeve assembly for use with a damper, comprising
    (a) a tubular, resilient inner layer;
    (b) a tubular, resilient outer layer bonded to the inner layer, and
    (c) a pair of corded fabrics inserted between the inner and outer layers, wherein an upper portion of the first fabric overlaps a lower portion of the second fabric, and the cord angles of the first and second fabrics are selected so that the inflated diameters of the inner and outer layers adjacent the second fabric are greater than the inflated diameters of the inner and outer layers adjacent the first fabric.

5. The air sleeve assembly as specified in claim 4 wherein:
    (a) the cord angle for the first fabric is in the range of approximately 50 to 55 degrees; and
    (b) the cord angle for the first fabric is in the range of approximately 65 to 70 degrees.

6. A vehicular suspension device comprising:
    (a) a damper having relatively movable telescopic parts including
        (i) a rigid tubular member,
        (ii) a piston assembly mounted inside the tubular member for stroking movement,
        (iii) a piston rod connected to the piston assembly and extending through one end of the tubular member;
    (b) air sleeve means having
        (i) a tubular, resilient inner layer,
        (ii) a tubular, resilient outer layer bonded to the inner layer, and
        (iii) a pair of corded fabrics inserted between the inner and outer layers, wherein an upper portion of the first fabric overlaps a lower portion of the second fabric, and the cord angles of the first and second fabrics are selected so that the inflated diameters of the inner and outer layers adjacent the second fabrics are greater than the inflated diameters of the inner and outer layers adjacent the first fabric;
    (c) first fastener means for securing a lower portion of the inner and outer layers in an airtight manner with respect to the tubular member, wherein a rolling lobe is provided in the portion of the air sleeve means between the first fastener means and the overlapped portions of the corded fabrics; and
    (d) a second fastener means for securing an upper portion of the inner and outer layers in an airtight manner with respect to the piston rod so that the air sleeve means forms a closed chamber for receiving pressurized fluid, the chamber surrounding a portion of the damper to provide an air spring capable of yieldably resisting telescopic movement with the damper.

7. The vehicular suspension device as specified in claim 6 wherein:

(a) the cord angle for the first fabric is in the range of approximately 50 to 55 degrees; and
(b) the cord angle for the second fabric is in the range of approximately 65 to 70 degrees.

* * * * *